US008612868B2

(12) United States Patent
Cheng et al.

(10) Patent No.: US 8,612,868 B2
(45) Date of Patent: Dec. 17, 2013

(54) COMPUTER METHOD AND APPARATUS FOR PERSISTING PIECES OF A VIRTUAL WORLD GROUP CONVERSATION

(75) Inventors: Li-Te Cheng, Malden, MA (US); Steven L. Rohall, Winchester, MA (US); John F. Patterson, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 12/055,650

(22) Filed: Mar. 26, 2008

(65) Prior Publication Data

US 2009/0249228 A1 Oct. 1, 2009

(51) Int. Cl.
*G06F 3/00* (2006.01)
*G06F 3/048* (2013.01)

(52) U.S. Cl.
USPC ............................ 715/758; 715/757; 715/759

(58) Field of Classification Search
USPC ......... 715/751, 753, 758, 848, 850, 757, 759; 709/204–206
See application file for complete search history.

(56) References Cited

U.S. PATENT DOCUMENTS

| | | | |
|---|---|---|---|
| 6,119,147 A | 9/2000 | Toomey et al. | |
| 6,784,901 B1* | 8/2004 | Harvey et al. | 715/757 |
| 7,159,178 B2 | 1/2007 | Vogt et al. | |
| 7,386,799 B1* | 6/2008 | Clanton et al. | 715/758 |
| 7,669,134 B1* | 2/2010 | Christie et al. | 715/758 |
| 2005/0091578 A1* | 4/2005 | Madan et al. | 715/512 |
| 2007/0002057 A1* | 1/2007 | Danzig et al. | 345/473 |
| 2007/0011273 A1 | 1/2007 | Greenstein et al. | |
| 2007/0277115 A1 | 11/2007 | Glinsky et al. | |
| 2008/0114844 A1* | 5/2008 | Sanchez et al. | 709/206 |
| 2008/0307322 A1* | 12/2008 | Stochosky et al. | 715/752 |
| 2009/0019367 A1 | 1/2009 | Cavagnari et al. | |
| 2009/0210789 A1 | 8/2009 | Thakkar et al. | |

OTHER PUBLICATIONS

Mary Millhollon et al., "Microsoft office word 2003 inside out", 2004, Microsoft press 7 pages.*
Drew H., "Information Spaces" http://replay.waybackmachine.org, 5 pages retrieved from internet on Mar. 27, 2011.

* cited by examiner

*Primary Examiner* — Haoshian Shih
(74) *Attorney, Agent, or Firm* — Hamilton, Brook, Smith & Reynolds, P.C.

(57) ABSTRACT

Computer method and apparatus persists portions of group conversations in a virtual environment. A group conversation is formed of group member communications. Indications or illustrations, such as chat bubbles, are displayed to end users to represent the group member communications. The invention system enables a user to persist a portion of the group conversation by selecting respective indicators (e.g., chat bubbles) corresponding to one or more of the group member communications. The processor (persist engine) also enables any user to interact with persisted conversation portions. Interactions supported include moving, arranging, tagging with metadata and saving snapshots of the persisted conversation portions, in the virtual environment.

20 Claims, 7 Drawing Sheets

COMPUTER METHOD AND APPARATUS FOR PERSISTING PIECES OF A VIRTUAL WORLD GROUP CONVERSATION

RELATED APPLICATIONS

Subject matter of the present invention is related to that of U.S. patent application Ser. No. 10/973,124 (published as US2006/0090137A1) for "Method and Apparatus for Constructing Free-form Threaded On-line Conversations" by assignee and herein incorporated in it's entirety.

BACKGROUND OF THE INVENTION

Virtual worlds such as Second Life, There.com, Active Worlds, World of Warcraft, etc. facilitate synchronous communication via avatar-centric chat. Specifically, users teleoperate avatars in a virtual place, and engage in a chatroom-style conversation, where messages appear as bubbles floating above the avatars' heads like in comic strips. Certain instant messaging clients, such as Yahoo Instant Messenger with Yahoo Avatars, support similar interactions—where the chat participants are portrayed as avatars in a single room, and messages also graphically appear as chat bubbles.

A common problem in these conversation contexts is the desire to persist interesting pieces of conversation for later reference. This could be for a document being created, or for a common activity such as collecting ideas for a brainstorm. There are a variety of solutions that can be classified into the following categories:

Record Everything+Posthoc Analysis. Most of the above systems directly support, or provide add-ons, to record the entire conversation. The recording is accomplished by either logging all chat messages—or an automatically filtered set of messages—or by recording a screen movie. Afterwards someone has to manually sift through the recording to extract the "interesting" pieces, or a software application does automated analysis for "interesting" highlights, or a semi-automated process is used. As a result, this can be a labor-intensive operation depending on the complexity of the conversation.

Assign a Scribe. During the conversation, someone volunteers to be a "scribe"—the note-taker. The volunteer then multitasks—he or she may want to participate in the conversation, but also has to take notes. More importantly, this volunteer has to pay enough attention to manually identify "interesting" highlights to record. As a result, this can be a labor-intensive task for the volunteer.

Active Participation. During the conversation, anyone who wishes to persist an interesting piece of information makes a note. Then the notes are submitted on the spot, or collected afterwards. In a virtual world, users need a specialized authoring tool (e.g. a virtual shared post-it note) to do this. If such a tool is not supported, users need to do this manually with an external application (e.g. text editor).

A related problem is the desire to create virtual artifacts with textual content, based on a conversation. Such artifacts can be useful as shared media (e.g. a reference document to pass around, a virtual poster, a set of virtual post-it notes on a whiteboard, etc). A common approach involves the user creating the desired artifact with whatever tools are available, and then copy/pasting textual content into the artifact.

SUMMARY OF THE INVENTION

Applicants contend that the process of persisting interesting pieces of conversation can be streamlined into a first-class operation in virtual worlds as well as in avatar-based chat spaces in instant messaging environments. The present invention is akin to the "active participation" approach, but treats all chat bubbles as potential targets for anyone to persist and share as a virtual object.

In one embodiment, the present invention provides computer method and apparatus for persisting a portion of group conversations in a virtual environment. The method and system comprise:

providing a group conversation in a virtual environment, the group conversation being formed of a plurality of a group member (participants) communications;

displaying to a user indications of the group member communications or messages; and enabling the user to persist a portion of the group conversation by the user selecting the respective displayed indications of ones of the group member communications, and the user selected ones being persisted.

Embodiments of the present invention extend the existing notion of bubble-based chats in virtual environments and avatar-based IM (instant messaging) spaces in the following ways:

Bubbles can be persisted by any user: Any user can select a chat bubble (including another user's bubble) and choose to persist it (preventing it from disappearing after a time limit). Other graphical illustrations or visual renditions or the like of messages by chat participants (users' avatars) in addition to chat bubbles can be used.

Persisted Bubbles can be moved by any user: Any user can move a persisted bubble in the virtual environment (e.g. to create groupings for a brainstorming session, to arrange bubbles into a flow diagram, assign bubbles as task objects to people, etc).

Persisted Bubbles can be tagged by any user: Any user can annotate a persisted bubble with additional metadata which can be textual or graphical (e.g. assign a priority/severity level).

Persisted Bubbles can be arranged on a map surface: Any user can move persisted bubbles on a graphical shared surface (e.g. the floor) where the bubble's placement on the surface has a semantic meaning (e.g. the floor has a picture of a global map, a calendar, an org chart).

Arrangements of Bubbles/Surfaces can be snapshotted: Any user can save the current arrangement of bubbles and map surface for later use (e.g. saving the state of a current brainstorming session, reloading later for a presentation).

Through these characteristics, the present invention enables users to easily transform casual virtual world (including gaming world environments) group conversation into persistent conversation, and furthermore, turn pieces of conversation into objects that can be manipulated into diagrams, post-it notes, and other physical artifacts found in real-world meetings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The present invention extends conventional bubble-based chat systems in virtual worlds and avatar-base IM spaces with the following technical mechanisms:

Bubbles can be persisted by any user: a user interface action/menu option selection (e.g. double-click) allows any user to update the state of the bubble (graphical message indicator/illustration of group member communication) from non-persistent to persistent. In one embodiment this is supported by program objects of class bubble and having a state attribute. The state attribute may toggle between (be set to) "non-persistent" and "persistent". Other attributes are as described below.

Persisted Bubbles can be moved by any user: persisted bubbles are treated as conventional virtual world object models that can be moved and manipulated by a user interface action (e.g. drag and drop).

Persisted Bubbles can be tagged by any user: a user interface action/menu option selection/toolbar function or operation (generally user command) allows any user to apply metadata. In response, the virtual world maintains a database 94 (FIG. 7) or uses an external tagging service to associate metadata to bubble objects.

Persisted Bubbles can be arranged on a map surface: persisted bubbles are treated as conventional virtual world object models that can be moved and manipulated by a user interface action, and the graphical shared surface is represented as a virtual object with target areas to apply semantics to bubble placements (e.g. trigger scripts can be assigned to target areas on the surface to associate dropped objects to dates on a calendar, people on an org chart, etc).

Arrangement of Bubbles/Surfaces can be snapshotted: a user interface action instructs the virtual world to save the state of bubbles and surfaces in a given area as specified by the user. The saved information is stored in a file system or database 94 (FIG. 7) that can be later recalled by another user interface action.

FIGS. 1-4 are several screenshots from one embodiment illustrating the present invention.

Figure 1:
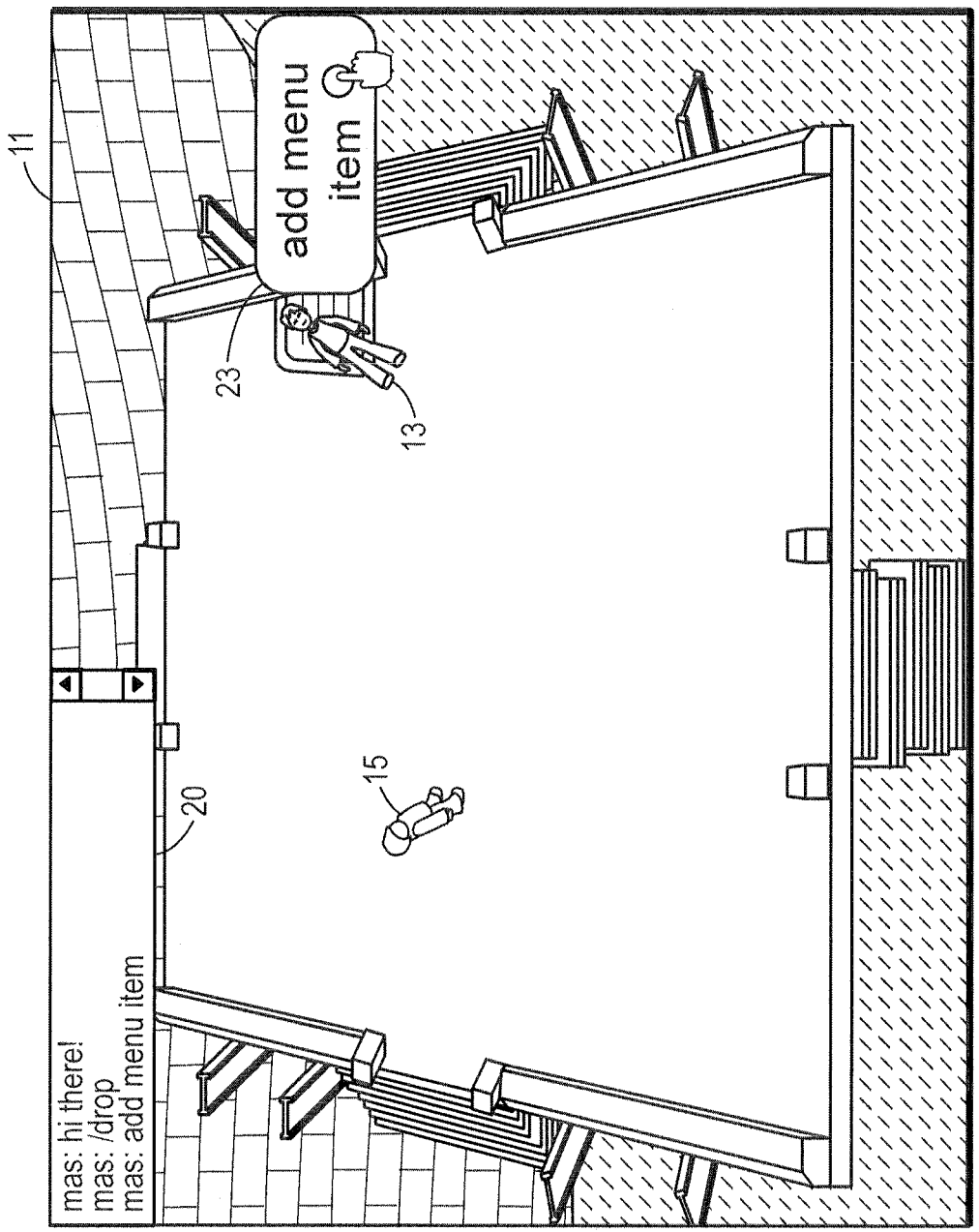
FIG. 1 is a schematic illustration of a screen view in one embodiment of the present invention showing a user persisting a chat bubble (i.e. graphical illustration of communications).

In the screen view 11 of FIG. 1, a yellow user 13 persists the chat bubble "Add menu item" 23 by clicking on (selecting) it.

Figure 2:
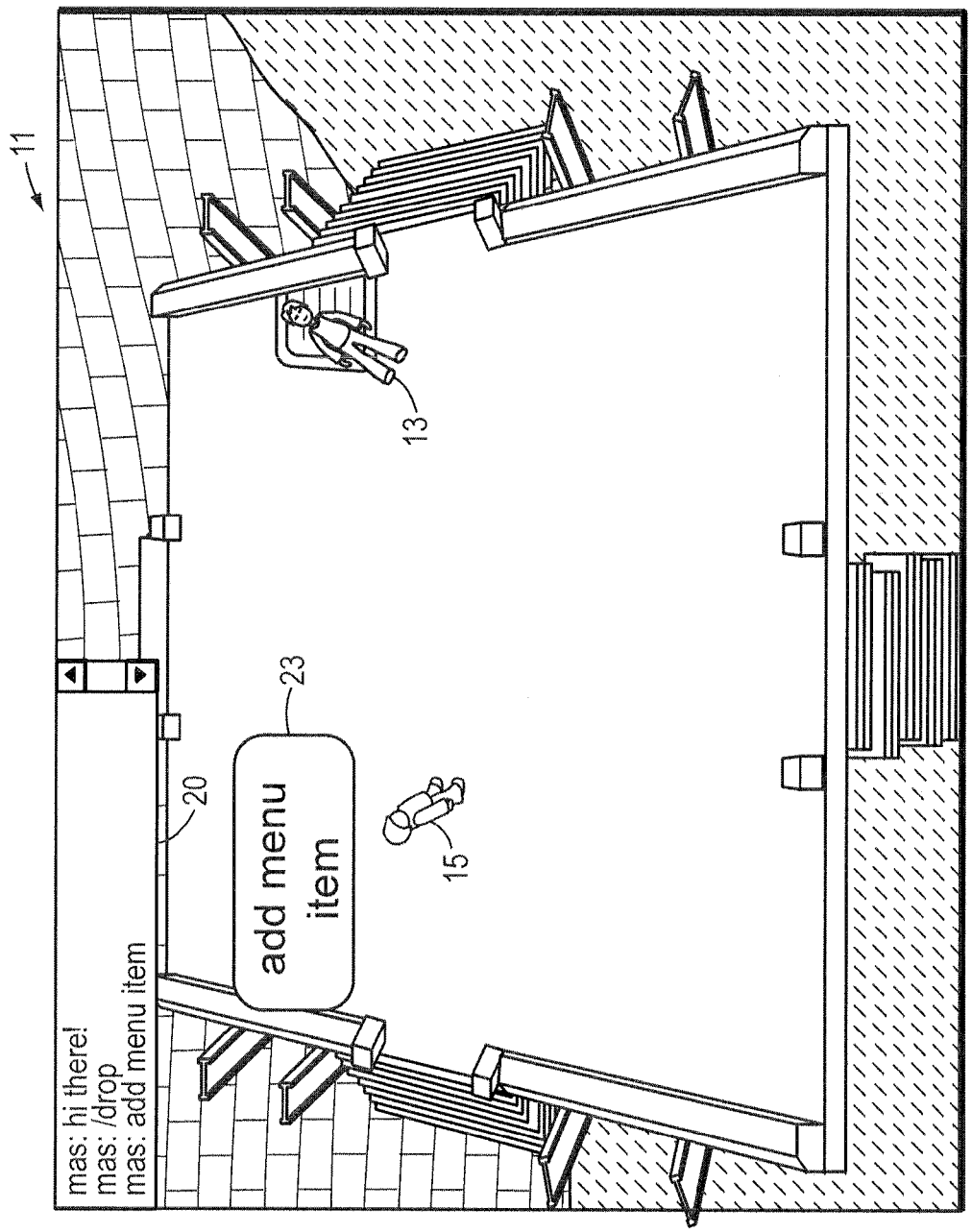
FIG. 2 is a schematic illustration of a screen view showing another user interacting with the persisted chat bubble of FIG. 1.

In FIG. 2 a red user 15 drags over, moves, or otherwise relocates the persisted bubble 23 (i.e. the subject chat bubble 23 now in a persisted state) to a position in the screen view 11 closer to him 15.

Figure 3:
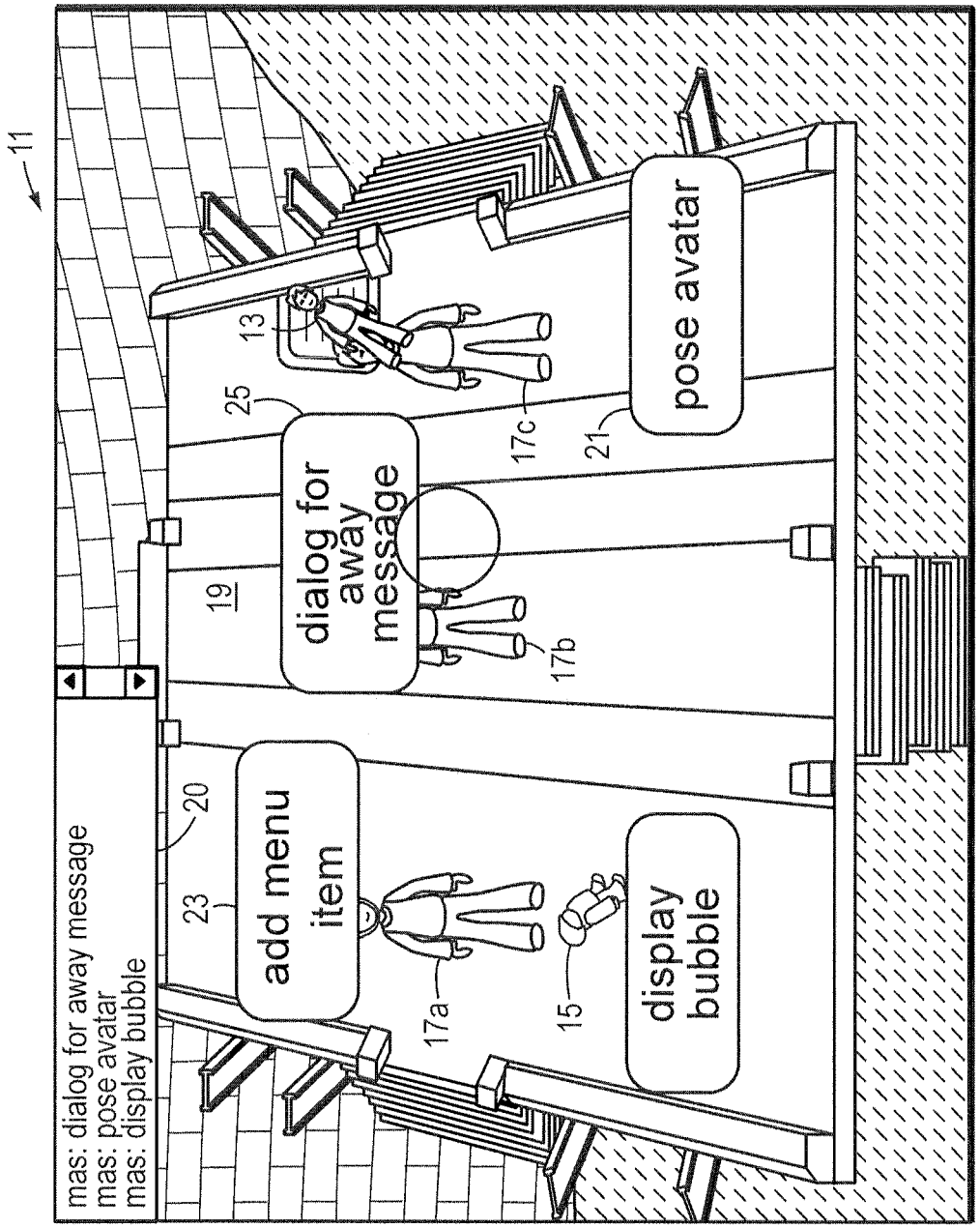
FIG. 3 is a schematic illustration of a screen view showing both users of FIG. 1 and FIG. 2 interacting with persisted chat bubbles (graphically illustrated communications).

In FIG. 3, both users 13, 15 arrange persisted bubbles 23, 25 on top of a graphical surface 19 displaying team members 17a, 17b, 17c to assign tasks to. The graphical surface 19 is a map surface with target areas programmed/configured to apply semantics to bubble placements as discussed above. Other map surfaces, working surfaces and the like are suitable for supporting graphical surface 19.

Figure 4:
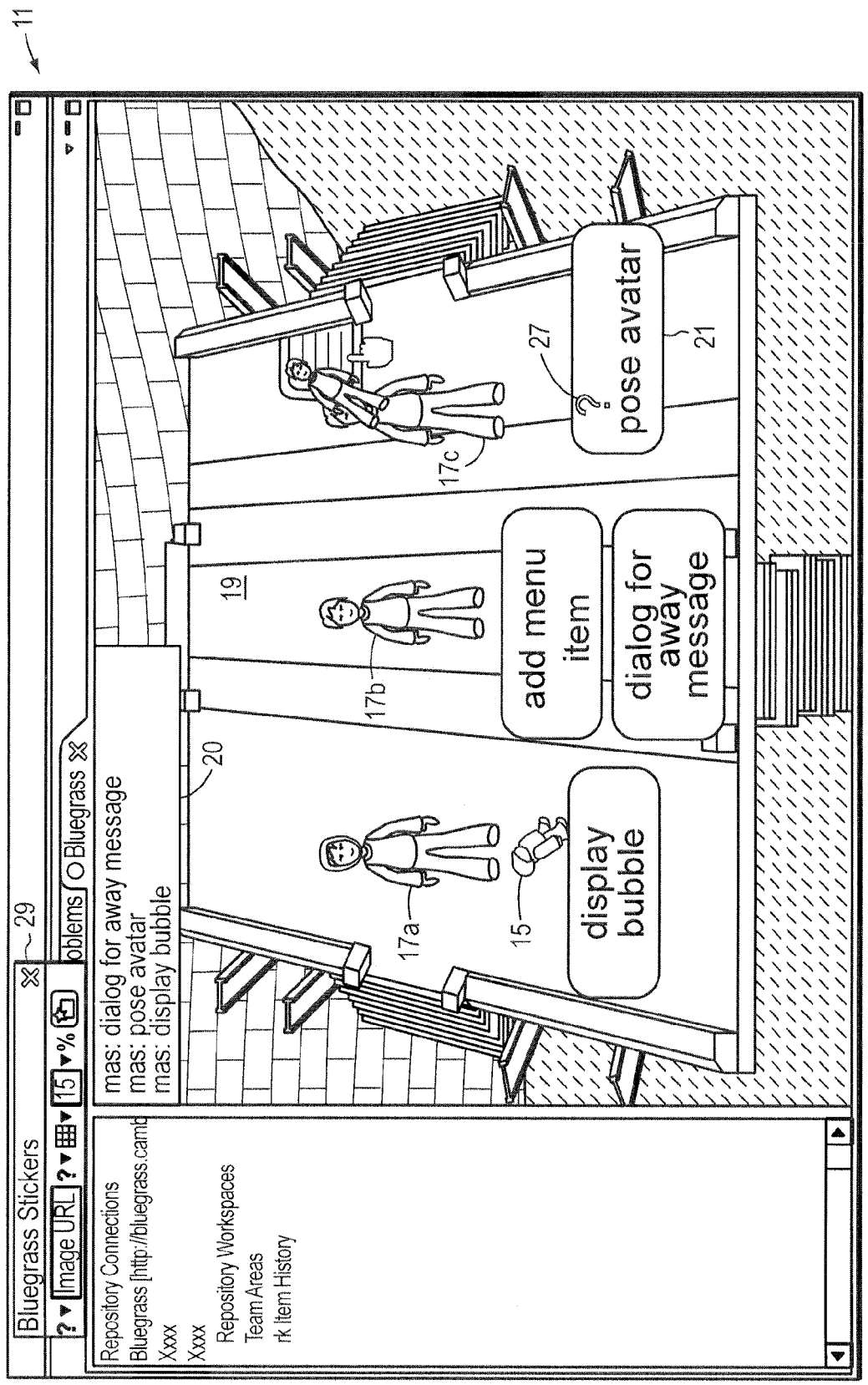
FIG. 4 is a schematic illustration of a screen view showing a user applying metadata in the embodiment of FIG. 1 through FIG. 3.

In the screen view 11 of FIG. 4, a user applies a question mark 27 (e.g. a user selected sticker in graphical interface 29) as metadata on "pose avatar" bubble 21. This is supported (implemented) by common object data handling and graphical user interface techniques. The user-selected item 27 may be any one or combination of text, graphics, line art, images, multimedia and the like.

A complete video showing one embodiment of the present invention can be viewed at slurl.com/secondlife and is incorporated herein by reference.

Figure 5:
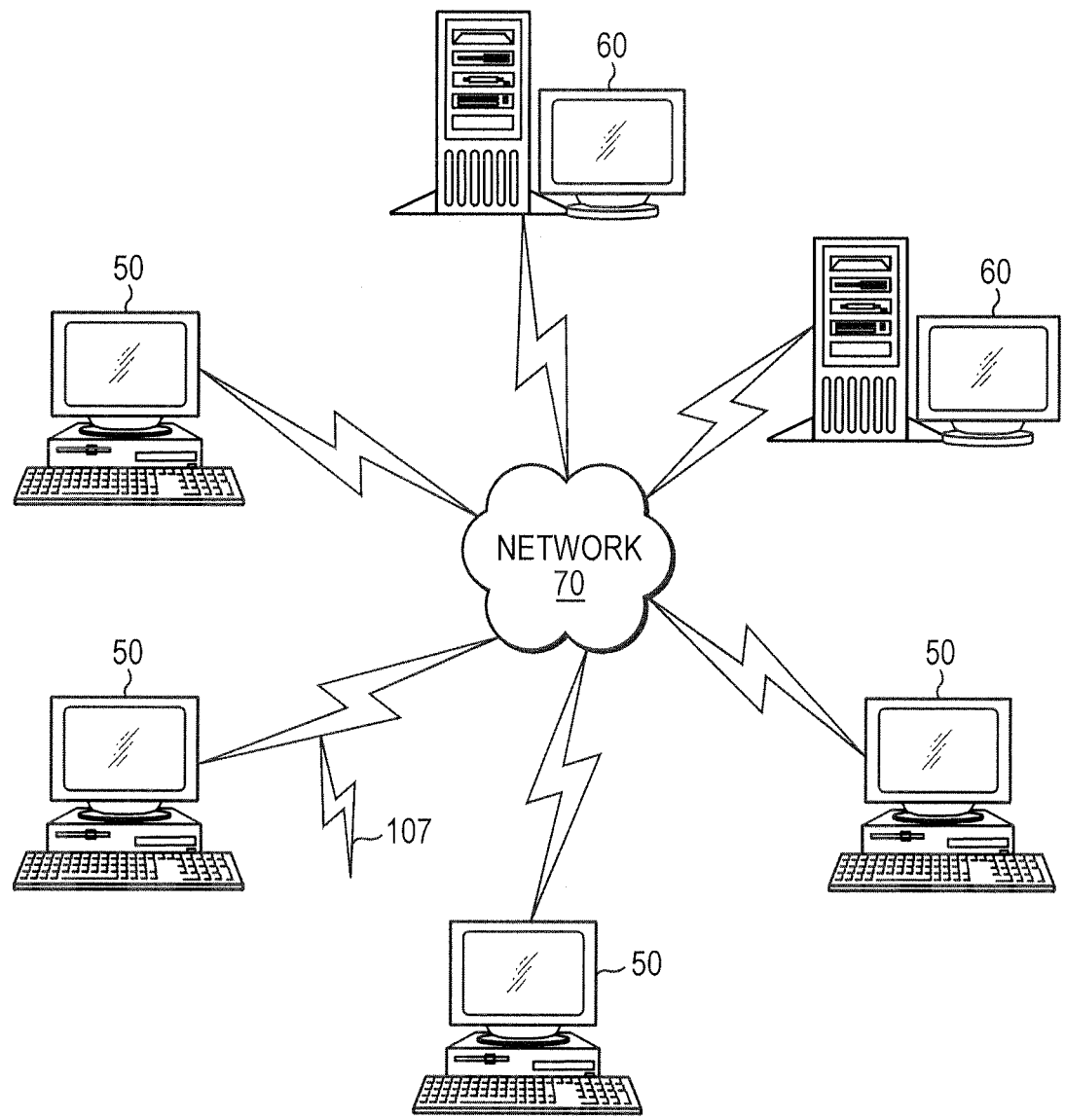
FIG. 5 is a schematic view of a computer network environment in which embodiments of the present invention are implemented.

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 6:
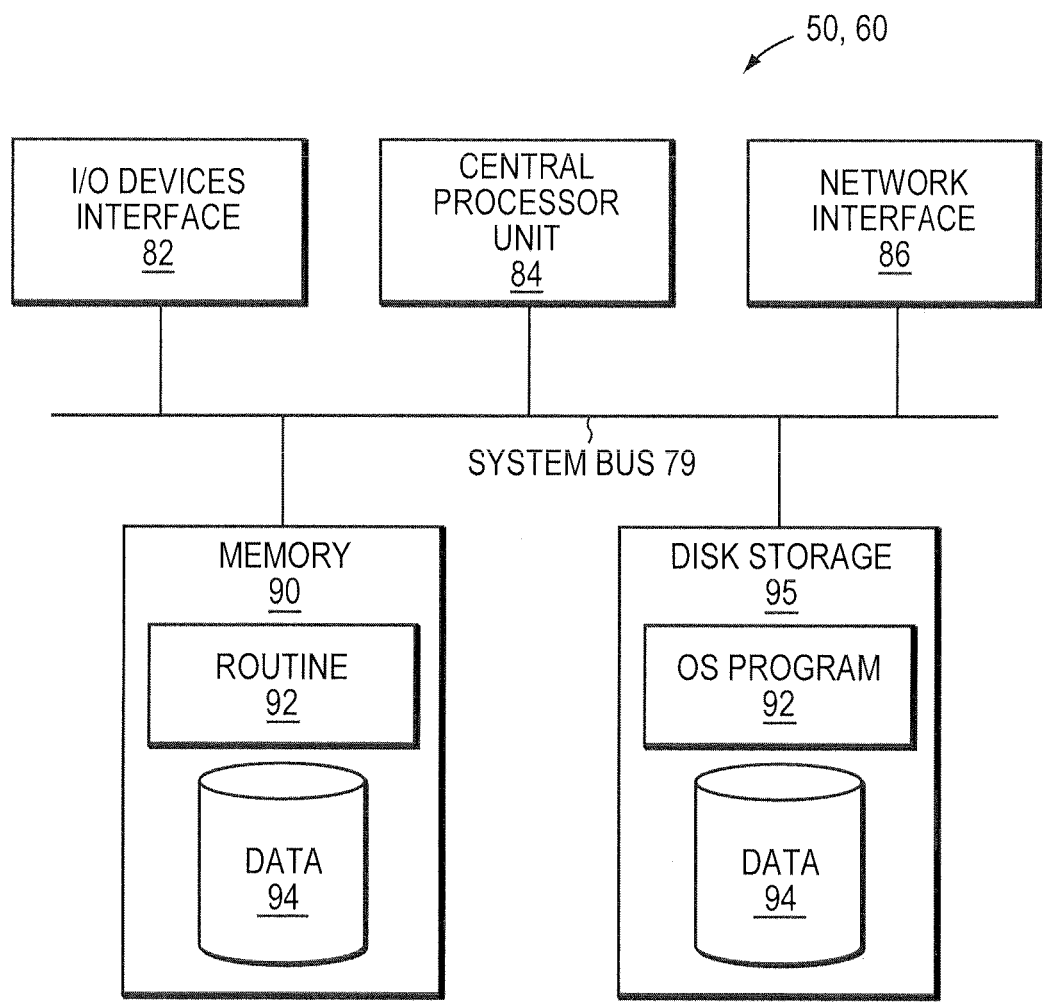
FIG. 6 is a block diagram of a computer node in the network of FIG. 5.
Figure 7:
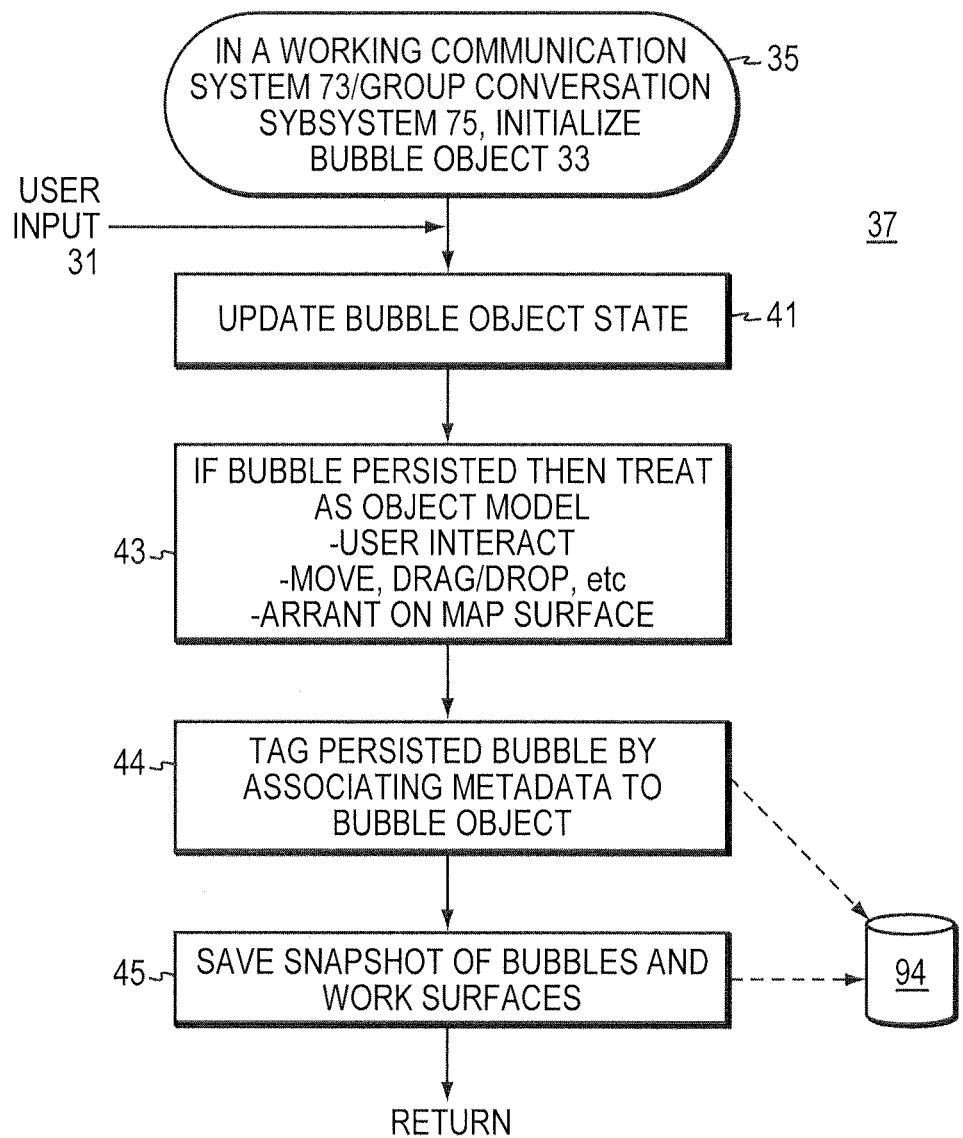
FIG. 7 is a flow diagram of one embodiments of the present invention.

With reference to FIGS. 5-7, embodiments of the present invention are implemented as follows. FIG. 7 outlines the flow of control and/or data in implementing an embodiment of the present invention. The invention system (processor or persist engine) 37 enhances a communication system 73 operating in a given virtual environment (e.g. virtual world, simulation, videogame, 3D gaming and the like). Other online sessions and computer network sessions accessible by two or more users for conversing or having group communications are contemplated.

In particular, the communication system 73 includes a group conversation module or subsystem 75, such as a chat mode, or instant messaging (IM) unit or other multiple user communication assembly. Preferably, the group conversation module 75 is graphical bubble-based, chat bubble-based or avatar IM based or the like. In invention system 37, the group conversation module/means is initially generated and supported by common chat and IM communication techniques. In this respect, system 37 displays graphical chat bubbles or other indications (graphical illustrations, etc.) of individual group member (users) communications in a current session of the virtual environment. A running tally or sum list of the communications and messages across all (or the most recent) group members is shown in a window 20 (FIGS. 1-4) and represents the current group conversation.

Next in accordance with the present invention, chat bubbles 23 and similar indications/graphics illustrating chat participants messages in group conversations are initialized with respective programming objects 33 (step 35) or similar data structure. In response to user input (e.g. action or command) 31 to make a chat bubble (graphically illustrated message generally) 23 persistent as described above in FIG. 1, processor or persist engine procedure step 41 updates the bubble object 33 state. This effectively persists or saves a piece of a group conversation, i.e., the portion corresponding to and illustrated/represented by the user-selected chat bubble 23.

Once the bubble object 33 state is effectively set to "persist" (e.g. Persist=True), the invention system 37 (step 43) treats the persisted chat bubble 25 as an object model in the virtual environment screen views. Accordingly, step 43 in response to user interaction enables the persisted bubbles 25 to be interacted with, moved and arranged on a graphical surface 19, and the like (as described above in FIGS. 2 and 3). Common or known graphical user interactivity (e.g. drag and drop) is employed here. Step 44 enables a user to tag or otherwise associate metadata to the bubble object 33 corresponding to (or manifested as) the user coupling text, graphics, images or multimedia 27 with the illustrated bubble 21, 25 as described in FIG. 4 above. The metadata and corresponding object association data is stored in a file 94 for example using known technology.

Step 45 of invention system 37 is responsive to user command to save a snapshot of bubbles 21, 25 and work surfaces as arranged in the virtual environment. Step 45 accomplishes this by saving to a file or database 94 indications of (defining information regarding) the arrangements and states of bubbles 21, 25 and graphical surfaces 19. Step 45 follows conventional techniques for storing such data in a manner that enables subsequent search and retrieval of the snapshot on user or application/program command (query).

FIG. 5 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., virtual environment communication system, group conversation subsystem, invention processor code 37 for persisting conversation portions and enabling other user interaction detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

As used herein the term "bubble" is illustrative and non-limited for indicating any graphical illustration of messages among or between chat/group conversation participants.

The term "virtual environment" includes gaming environments, 3D videos, simulations, virtual worlds and other network session environments.

Where programming or model objects are used in the above description of the invention, it is understood that other computer-related implementations, data structures and processor/methods and the like are suitable. The foregoing use of programming or model objects is for purposes of illustration and not limitation.

Further, the computer architecture and network configuration of FIGS. 5 and 6 are for purposes of illustration and not limitation. Other computer architectures and configurations are suitable.

In the context of a computer network, the terms "on-line session" and "network session" are intended to be non-limiting examples. Other group communications sessions, conversation and/or messaging sessions and the like are suitable.

What is claimed is:

1. A computer method of persisting a portion of group conversations in a virtual environment, comprising:
    providing a group conversation in a virtual environment, the group conversation being formed of a plurality of group member communications;
    displaying to a user chat bubble indications of the group member communications in the plurality, wherein the virtual environment includes avatars representing users and includes the chat bubble indications of the group member communications, the displayed chat bubble indications initially being non-persistent wherein each of the chat bubble indications has a non-persistent state and a persistent state and has a user interface effecting change in state of the chat bubble indication; and
    enabling the user to selectively persist a portion of the group conversation by the user selecting, through respective user interface of chat bubble indications, ones of the group member communications, and each of the user selected ones of the group member communications and corresponding chat bubble indications changing from the respective non-persistent state to a persistent state and being persisted as a respective virtual object in the virtual environment such that the user selected ones are prevented from disappearing, after a time limit, from the virtual environment, and such that the corresponding chat bubble indications change, user-selectively, from being non-persistent to being respective persistent virtual objects displayed as chat bubble indications, wherein the respective virtual objects are user moveable in the virtual environment and are user manipulateable in the virtual environment.

2. A method as claimed in claim 1 wherein the virtual environment is any one of a virtual world, a gaming environment, a 3D video, a simulation, an online session, and a computer network session.

3. A method as claimed in claim 1 wherein the group conversation is bubble based such that each of the group member communications is indicated in a respective graphical bubble of an avatar in the virtual environment, different users being represented by different avatars in the virtual environment.

4. A method as claimed in claim 3 wherein the step of enabling includes persisting the user selected ones of the group member communications corresponding to graphical bubbles selected by the user.

5. A method as claimed in claim 4 further comprising enabling any user to interact with the user selected graphical bubbles, for a given user selected graphical bubble, said interacting with including any of: moving the given graphical bubble, tagging the given graphical bubble with user specified metadata, making an arrangement of the given graphical bubble with other graphical bubbles in the virtual environment and making a snapshot of at least the given graphical bubble.

6. A method as claimed in claim 4 further comprising enabling any user to save a snapshot of one or more of the user selected graphical bubbles as arranged on a working surface in the virtual environment.

7. A method as claimed in claim 1 wherein the group conversation is instant messaging based.

8. A method as claimed in claim 1 wherein the group conversation is chat based.

9. Computer apparatus for persisting a portion of group conversations in a virtual environment, comprising:
    a communication system formed a computer memory and digital processor, said communication system providing a group conversation in a virtual environment, the group conversation being formed of a plurality of participant-users' communications and the plurality of participant-users' communications being illustrated in the virtual environment using bubble-type indications, wherein the virtual environment includes avatars representing users, wherein each chat bubble-type indication has a non-persistent state and a persistent state and has a user interface effecting change in state of the bubble-type indication, and the bubble-type indications initially being non-persistent; and
    a persist engine executable by the processor enabling a subject user to selectively persist a portion of the group conversation by the subject user selecting, through the virtual environment illustrations and respective user interface of bubble type indications, ones of the participant-users' communications, and the subject user selected ones changing from non-persistent state to persistent state and being persisted as respective virtual objects in the virtual environment that can be moved and manipulated by a virtual environment user interface action such that the user selected ones are prevented from disappearing, after a time limit, from the virtual environment, and such that corresponding bubble-type indications change, user-selectivity, from being non-persistent to being respective persistent virtual objects displayed as bubble type indications, wherein the persist engine enables the subject user to select the bubble-type indications representing the respective ones of the participant-users' communications, and the user selected bubble-type indications are persisted as respective bubble type indications in the virtual environment.

10. Computer apparatus as claimed in claim 9 wherein the virtual environment is any one of a virtual world, a gaming environment, a 3D video, a simulation, an online session, and a computer network session.

11. Computer apparatus as claimed in claim 9 wherein the group conversation is bubble based such that each of the participant-user's communications is illustrated in a respective graphical bubble of an avatar in the virtual environment, different users being represented by different avatars in the virtual environment.

12. Computer apparatus as claimed in claim 11 wherein the persist engine persists the subject user selected ones of the participant-user's communications corresponding to graphical bubbles selected by the subject user.

13. Computer apparatus as claimed in claim 12 wherein the persist engine further enables any user to interact with the subject user selected graphical bubbles, said interacting with including any of: moving one or more of the subject user selected graphical bubbles, tagging with metadata any of the subject user selected graphical bubbles, making an arrangement in the virtual environment of one or more of the subject user selected graphical bubbles, and saving a snapshot of one or more of the subject user selected graphical bubbles.

14. Computer apparatus as claimed in claim 12 wherein the persist engine further enables any user to save a snapshot of one or more of the subject user selected graphical bubbles as arranged on a working surface in the virtual environment.

15. Computer apparatus as claimed in claim 9 wherein the group conversation is instant message based.

16. Computer apparatus as claimed in claim 9 wherein the group conversation is chat based.

17. A computer system for persisting a portion of group conversations in a virtual environment, comprising:
   group communication means for providing a group conversation in a virtual environment, the group conversation being formed of a plurality of group member communications;
   a user interface means for displaying to a user bubble indications of the group member communications, wherein the virtual environment includes avatars representing users and includes the bubble indications of the group member communications the displayed bubble indications initially being non-persistent, wherein each bubble indication has a non-persistent state and a persistent state and has a user interface effecting change in state of the bubble indication; and
   processor means for enabling the user to selectively persist a portion of the group conversation by the user selecting, through respective user interface of bubble indications, ones of the group member communications, and respective bubble indications of the user selected ones of the group member communications changing from non-persistent state to persistent state and being persisted as respective virtual objects in the virtual environment such that the user selected ones are prevented from disappearing, after a time limit, from the virtual environment, and such that the respective bubble indications change, user-selectivity, from being non-persistent to being respective persistent virtual objects displayed as bubble indications, wherein the respective virtual objects are user moveable and user manipulateable in the virtual environment.

18. A computer system as claimed in claim 17 wherein the virtual environment is any one of a virtual world, a gaming environment, a 3D video, a simulation, an online session, and a computer network session.

19. A computer system as claimed in claim 17 wherein the group conversation is one of: graphical bubble based, instant messaging based and chat based.

20. A computer program product comprising:
   a nontransitory computer readable storage medium having a computer readable program, wherein the computer readable program when executed on a computer causes:
   providing a group conversation in a virtual environment, the group conversation being formed of a plurality of a group member communications;
   displaying to a user bubble-type illustrations of the group member communications in the plurality, wherein the virtual environment includes avatars representing users and includes the bubble-type illustrations of the group member communications, the displayed bubble-type illustrations being in a non-persistent state wherein each bubble-type illustration has a persistent state and a non-persistent state and has a user interface effecting change in state of the bubble-type illustration; and
   enabling the user to selectively persist a portion of the group conversation by the user selecting, through respective user interface of bubble-type illustrations, ones of the group member communications, and the respective bubble-type illustrations of the user selected ones changing from non-persistent state to persistent state and being persisted as respective objects in the virtual environment such that the user selected ones are prevented from disappearing, after a time limit, from the virtual environment, and such that the respective bubble-type illustrations change, user selectively, from being non-persistent to being respective persistent bubble-type illustration object, wherein the respective bubble-type illustration objects are user moveable and user manipulateable in the virtual environment.

* * * * *